June 10, 1958 W. T. SELSTED 2,838,314

MAGNETIC TAPE APPARATUS

Filed Oct. 20, 1952 4 Sheets-Sheet 1

INVENTOR.
Walter T. Selsted

BY Flehr and Swain

ATTORNEYS

June 10, 1958 W. T. SELSTED 2,838,314

MAGNETIC TAPE APPARATUS

Filed Oct. 20, 1952 4 Sheets-Sheet 2

INVENTOR.
Walter T. Selsted

BY
Flehr and Swain

ATTORNEYS

INVENTOR.
Walter T. Selsted
BY Flehr and Swain
ATTORNEYS

June 10, 1958 W. T. SELSTED 2,838,314

MAGNETIC TAPE APPARATUS

Filed Oct. 20, 1952 4 Sheets-Sheet 4

INVENTOR.
Walter T. Selsted

BY Flehr & Swain

ATTORNEYS

United States Patent Office 2,838,314
Patented June 10, 1958

2,838,314

MAGNETIC TAPE APPARATUS

Walter T. Selsted, San Mateo, Calif., assignor to Ampex Corporation, a corporation of California Application October 20, 1952, Serial No. 315,758

6 Claims. (Cl. 274—4)

This invention relates generally to machines of the magnetic tape type for recording and/or reproducing sound or other frequencies.

Certain machines of the above type make use of a driving capstan which maintains driving engagement with the tape by application of pneumatic suction. Such a capstan has many desirable properties, particularly for the more elaborate precision machine. In the past it has been necessary with such machines to manually disengage the tape from the capstan to enable fast forward movement of the tape. This complicates operation of the machine and makes it necessary to interrupt the driving of the capstan for such operations. In addition certain machines of the above type are unsatisfactory with respect to the means employed to bring the recording and reproducing heads into operative engagement with the tape, and to correlate such operation with control of the suction applied to the capstan. Also, for high precision machines there is a problem with respect to smooth rotation of the capstan to avoid flutter or wow.

It is an object of the present invention to provide an improved machine of the above character having novel means for interrupting frictional driving engagement between the capstan and the tape.

Another object of the invention is to provide an improved machine of the above character having means enabling one to move the tape at a rapid rate in a forward direction, without manually removing it from its normal embracing relation with the driving capstan.

Another object of the invention is to provide improved means for mounting and for moving the magnetic heads into and out of operating engagement with the tape.

A further object of the invention is to provide improved means for coupling a driving motor to the capstan.

Additional objects of the invention will appear from the following description in which the preferred embodiment has been set forth in detail in conjunction with the accompanying drawing.

Referring to the drawing.

Figures 1, 8, 9:
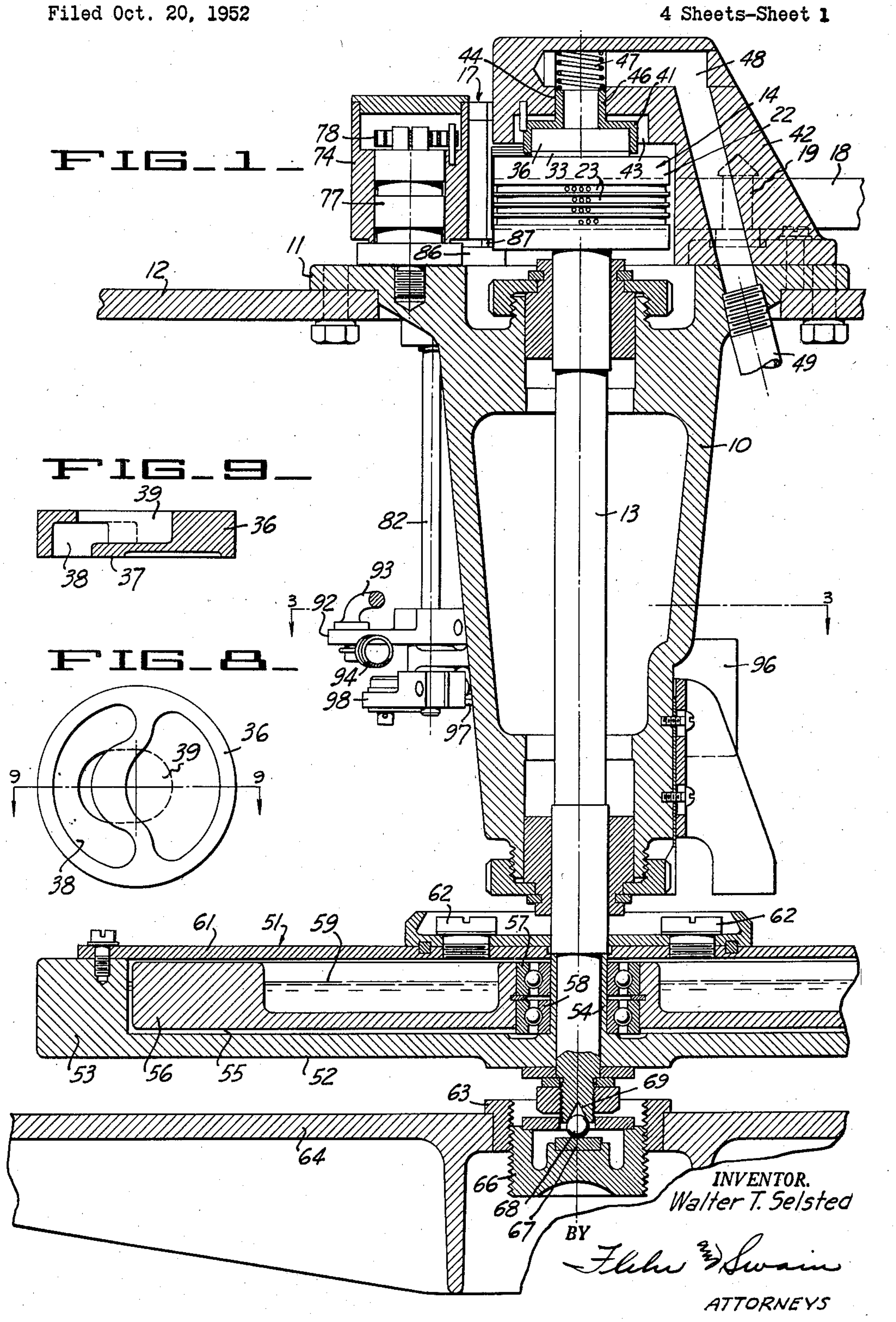
Figure 1 is a side elevational view in section illustrating a machine incorporating the present invention.
Figure 8 is an enlarged detail illustrating the distributing manifold which cooperates with the capstan.
Figure 9 is a section taken along the line 9—9 of Figure 8.

Figures 11 to 14, inclusive, are schematic detail views in section illustrating the manner in which the magnetic tape is either pressed against or caused to have a clearance with respect to the outer periphery of the capstan assembly by applying either pneumatic suction or pressure.

The machine as illustrated in the drawing (Figures 1, 2 and 6) consists generally of a hollow body 10 which has an upper flange 11 for attachment to the panel 12. A vertical shaft 13 is journaled within the body 10 and its upper end carries the capstan assembly 14. In conjunction with the capstan assembly I provide one or more magnetic head assemblies 16 and 17 (Figure 2), one of which can function for recording, and the other for playback (i. e. reproducing) operations.

Figures 2, 3, 4, 5:
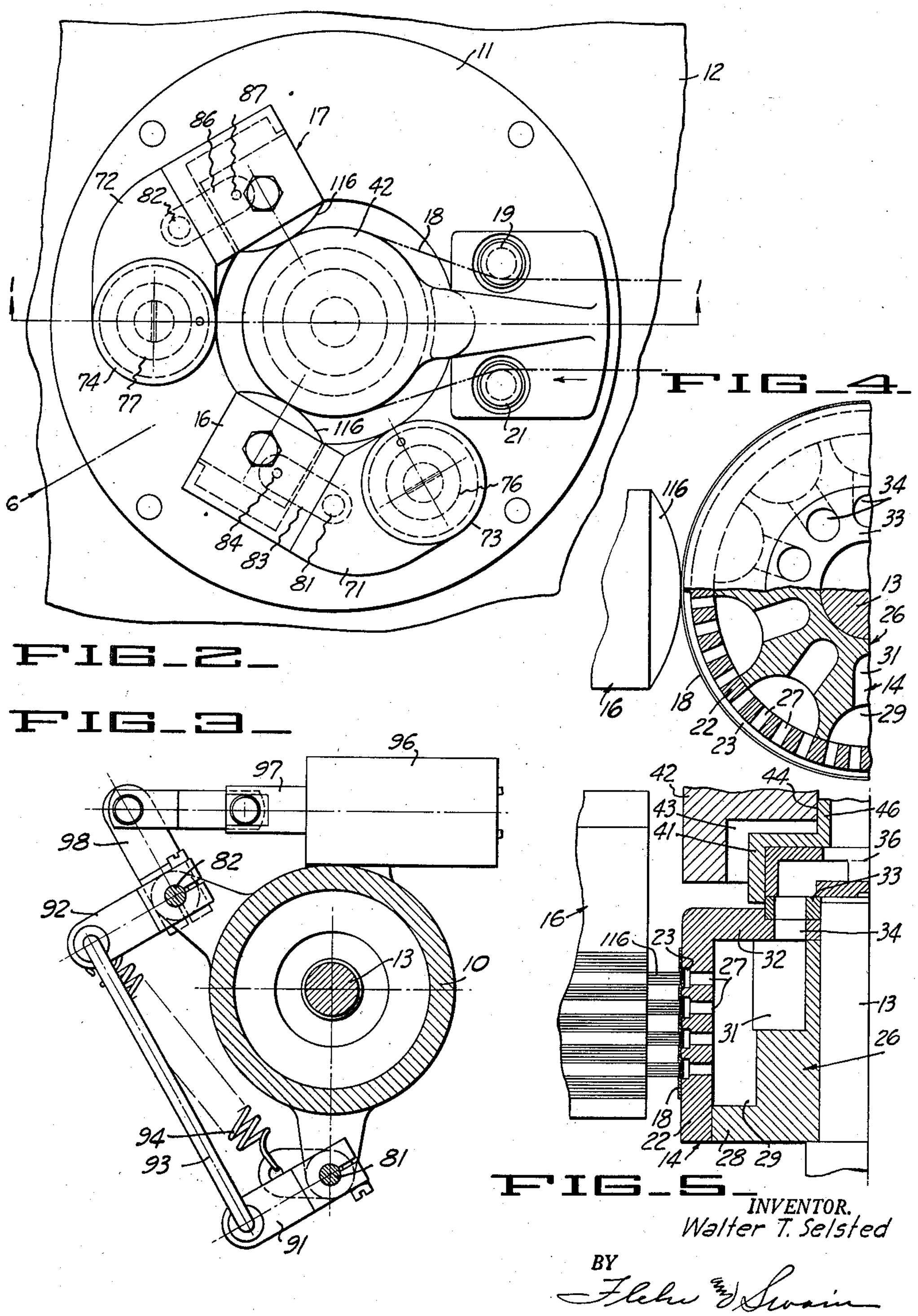
Figure 2 is a plan view of the machine illustrated in Figure 1.
Figure 3 is a cross-sectional view taken along the line 3—3 of Figure 1.
Figure 4 is a detail in section illustrating normal driving relation between the capstan and a magnetic tape.
Figure 5 is an enlarged detail in section illustrating the part shown in Figure 4 in side elevation.

As will be presently explained, the magnetic heads contact the exterior face of the tape during recording or playback operations, but are retracted from the tape during periods when it is desired to remove the tape or to move it independently of the capstan. In Figure 2 the tape is indicated at 18, and is shown engaging the guides 19 and 21. The ends of the tape are wound upon take-up and supply reels (not shown) which in turn are mounted upon suitable turntables. Suitable drive and braking means connect to the turntables to provide proper drag and take-up torque during normal operation.

The capstan assembly comprises a cylindrical-shaped sleeve or shell 22 having a plurality of circumferential cavities or grooves 23 formed on its exterior periphery (Figure 1). It provides an outer cylindrical surface for the capstan assembly. The sleeve 22 is non-rotatably fitted upon the distributor core 26. This core is provided with a plurality of longitudinally extending grooves or passages which communicate with the openings 27, provided in the side walls of the sleeve. It will be noted that the openings 27 are evenly spaced circumferentially about the sleeve, and that there is a series of such openings for each of the grooves 23.

Figures 6, 7:
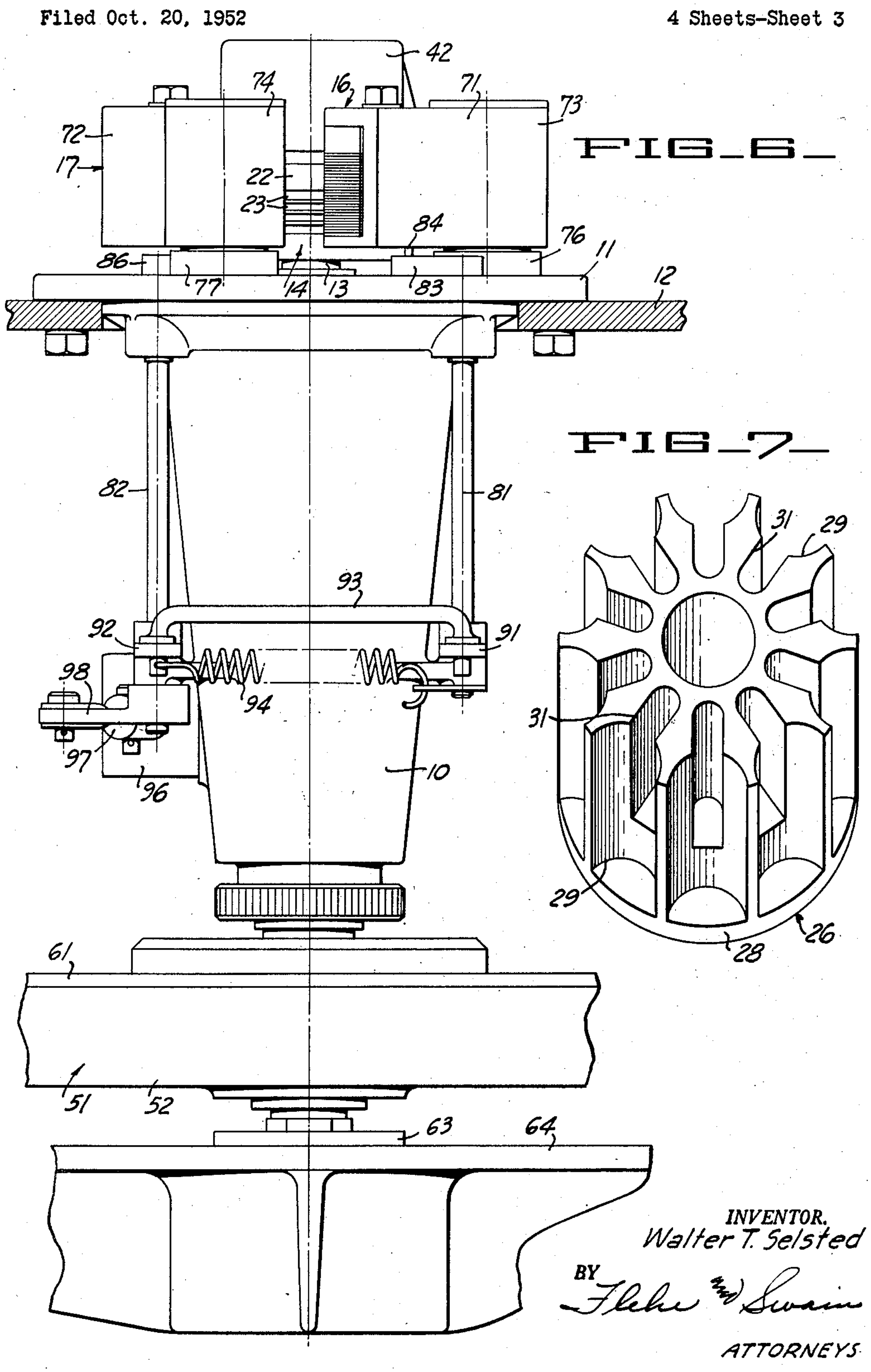
Figure 6 is a side elevational view of the machine as viewed in the direction indicated in Figure 2.
Figure 7 is an enlarged perspective view illustrating a part of the driving capstan.

The distributor core 26 can be constructed substantially as illustrated in Figure 7. It consists in this instance of a lower portion 28, which is circular and which fits within the lower end of the sleeve 22, together with a main body portion which is provided with the grooves or passages 29 and 31. The grooves 29 and 31 are in free communication, and in effect the grooves 31 simply extend the grooves 29 to a greater radial depth. There is an even circumferential distribution of the grooves about the circumference of the core and the dimensioning circumferentially is such that each groove 29 is in communication with a plurality of openings 27 for each groove 23 (Figure 4). The upper end of the sleeve 22 is secured to a top closure wall 32, which extends inwardly to the shaft 13, and over the grooves or passages 29 and 31 (Figure 5).

The upper face of the wall 32 is fitted with the insert 33, and this insert, together with the upper wall 32, is provided with the circumferentially spaced port openings 34. Each opening is adapted to communicate with a corresponding groove or passage 31.

Above the capstan there is a manifolding or valving plate 36 which establishes pneumatic communication with a limited number of openings 34, over an arc of say 180°. As shown in Figures 8 and 9, this manifold or valving member 36 is provided with a lower face 37 for establishing sealed rubbing contact with the upper face of the annular insert 33. Also, it is provided with an arcuate port or passage 38, which opens through the bottom face 37, and which is in free communication with the passage 39.

To retain the manifold 36 in proper operating relationship with the capstan, it is preferably fitted within the cup 41 (Figure 1). The body 10 is provided with a head 42, which extends generally over the capstan, and is there provided with a downwardly spaced annular cavity 43 for generally accommodating the cup 41. The head is also provided with a vertical bore 44, which slidably accommodates the sleeve 46. The sleeve is secured to the cup 41 and is urged downwardly by the compression spring 47. The manifold member 36 is thereby urged into sealing contact with the upper face of the capstan insert 33, whereby the passage 48 in the head is placed in pneumatic communication through the manifold member 36, with the interior of the capstan 14. In a typical arrangement the communication can be with a sufficient number of grooves 29 and 31, whereby all of the openings 27 extending over an arc of about 180° are in pneumatic communication with passage 48. This relationship is maintained as the capstan rotates.

Passage 48 is connected with a pipe or tube 49, and as will be presently explained, this pipe connects with pneumatic pump and valve control means whereby either pneumatic suction or pressure can be applied.

The drive for the capstan is preferably applied to the lower end of the shaft 13, through a flywheel assembly 51 which is provided with damping means. Thus, the assembly 51 can consist of an outer flywheel 52, provided with a weighted rim 53, which can be engaged by a driving belt. The hub 54 of the wheel 52 is keyed or otherwise fixed to the shaft 13. The outer flywheel is formed to provide an inner annular chamber 55, which accommodates the inner or secondary flywheel 56. This inner flywheel is journaled to the hub 54 by suitable means such as the ball bearing assemblies 57 and 58. Normally the cavity 55 contains a quantity of liquid 59, which can be a viscous oil, and which provides a damped fluid coupling between the two flywheels. The cover 61 for the flywheel is provided with removable plugs 62, to permit introduction or removal of liquids.

It will be evident that the flywheel assembly just described provides considerable momentum for the drive connection to an electric motor or like driving means, and the coupling of the two flywheels through the viscous liquid, provides a damping arrangement which serves to minimize sudden changes in angular velocity of the shaft.

In order to accurately locate the elevation of the capstan the lower end of the shaft engages an adjustable thrust bearing. This consists, for example, of a bushing 63 which is fitted in the frame part 64, and which is threaded to receive the threaded member 66. The member 66 carries a hardened disc 67, which is engaged by the hard ball 68. The ball is accommodated in a conical shaped recess 69, formed in the lower end of the shaft. It will be evident that this arrangement forms a thrust bearing having a minimum amount of friction, and which makes possible adjustment of the shaft 13 and the capstan to a desired elevation.

In order to permit movement of the magnetic heads 16 and 17 toward and away from the capstan, they are mounted upon the arms 71 and 72, which are secured to the vertically disposed hubs 73 and 74. The hubs in turn are journaled upon the studs 76 and 77, which are mounted upon the flange 11. Above the stud 77, there is a spiral spring 78 having one end of the same attached to the studs 77 and its other end to the sleeve 74. This spring is tensioned to provide a constant torque that urges the sleeve 74 in a direction to press the corresponding head 17 toward the capstan. A similar spring (not shown) is provided for the stud 76 and sleeve 73, whereby the head 16 is likewise urged toward the capstan.

In order to effectively retract the magnetic heads in a direction away from the capstan, I provide a pair of vertically extending and rotatable rods 81 and 82. These rods have their upper and lower ends suitably journaled to parts carried by the body 10, and their upper ends are provided with means forming loose mechanical connections with the magnetic heads. Thus, the upper end of the rod 81 is provided with an arm 83 which is loosely connected by the pin 84 with the lower part of the magnetic head 16. Thus, when rod 81 is turned in a counter-clockwise direction as viewed in Figure 2, the head 16 is retracted from the capstan. However, when the arm is in the limiting position shown in Figure 2, it has no effect upon the head 16 and the head is urged solely by the spring 78.

The upper end of the rod 82 is similarly provided with an arm 86, carrying a pin 87 for forming a loose connection with the lower part of the head 17. Thus when rod 82 is turned in a counter-clockwise direction (as in Figure 2), the head 17 is retracted from the capstan.

Below the panel 12 the rods 81 and 82 are connected for conjoint rotation. Thus, arms 91 and 92 are connected to the lower portions of these rods, and these arms are connected by the link 93. A tension spring 94 has its one end connected to arm 92, and its other end attached to a part of the body 10 whereby both arms 91 and 92 are normally urged to rotate in a counter-clockwise direction, to thereby retract the magnetic head. The tension of spring 94 is sufficient to overcome the tension of the two spiral springs (i. e. springs 78). A suitable operating means is provided such as the solenoid 96, which is shown mounted in the body 10. The operating member 97 of this solenoid is shown connected to the arm 98, which in turn is attached to rod 82. Thus, when the solenoid is energized, rods 81 and 82, together with arms 91 and 92, are rotated in a clockwise direction, to overcome the tension of spring 94, and to thus permit the magnetic heads to move toward the capstan, and to be urged toward the capstan solely by the tension of the spiral springs 78.

Figure 10:
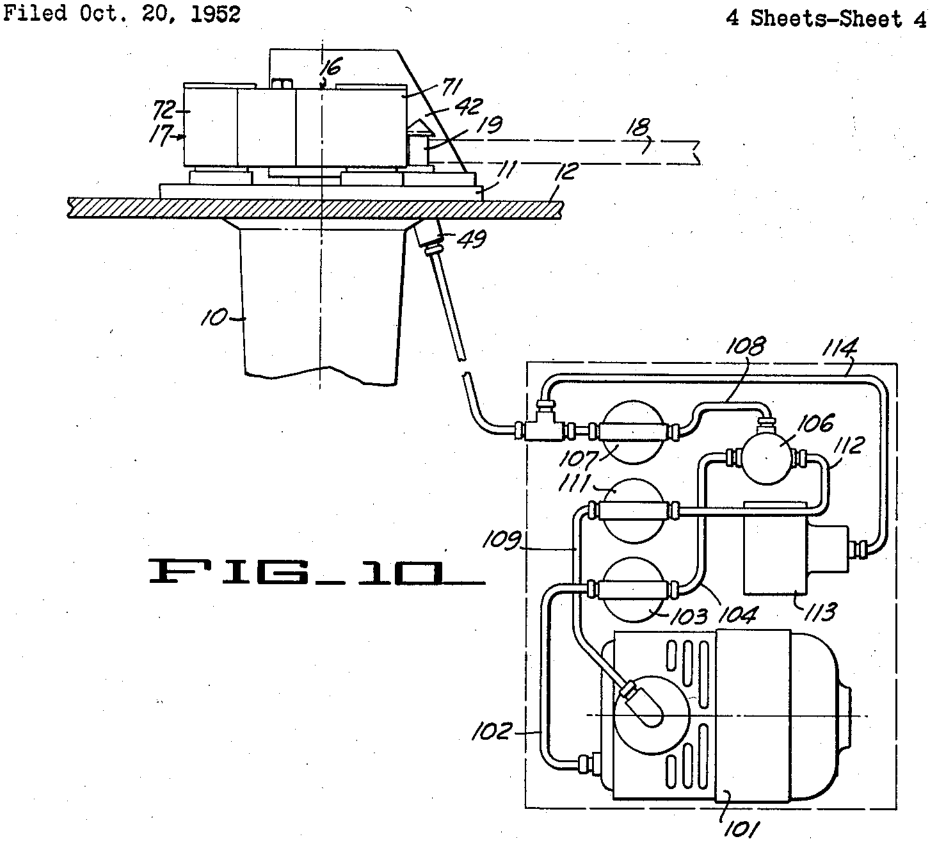
Figure 10 is a schematic view illustrating the pumping and valve means for applying either pneumatic suction or pressure to the capstan assembly.

The means schematically shown in Figure 10 for applying pneumatic suction or pressure to the capstan, consists of a suitable pneumatic pump 101, such as one of the rotary vane type. The inlet or suction side of the pump is shown connected by pipe line 102 with the oil separator 103, which in turn is connected by pipe 104 to the valve 106. The valve 106 is connected to suitable means for its remote operation, as for example a solenoid or small electric motor. The pipe 49 which connects to the capstan is also connected to the valve 106 by way of the air filter 107, and line 108. The pneumatic pressure line 109 leading from the compressor 101 connects with the air filter 111, and from thence to the valve 106 by line 112. Vacuum indicating means 113 is shown connected to line 49 by line 114. The valve 106 is constructed whereby it has two operating positions, in one of which the vacuum line 102 is placed in communication with the line 49 through the oil separator 103, line 104, valve 106, line 108, and air filter 107. In the other operation of the valve 106, the pressure line 109 from the pump 101 is connected with line 49 through the air filter 111, line 112, valve 106, line 108, and air filter 107. When suction line 102 is effectively connected to line 49, the discharge line 109 is vented to the atmosphere. Likewise, when the line 109 is connected to line 49, suction line 102 is vented to the atmosphere. Such venting is accomplished by the construction of the valves 106. Device 113 can be a simple spring-loaded pressure cell (not shown), together with a set of electrical contacts which are operated when a sufficiently high suction is applied to line 49 for normal operation. The contacts can connect with a suitable indicator or signal circuit.

By suitable circuit means (not shown) the operation of the valve 106 is coordinated with the operation of the solenoid 96. Thus, when the solenoid 96 is energized and the magnetic heads are urged against the magnetic tape, valve 106 is conditioned whereby suction is applied to line 49. When solenoid 96 is deenergized, to cause the magnetic head to be retracted from engagement with the magnetic tape, valve 106 is positioned whereby air under pressure is supplied to line 49.

As is well understood by those familiar with magnetic tape recording or reproducing machines, the magnetic heads can be variously constructed and their design will be dictated by the performance characteristics desired. Assuming multi-channel operation, these heads can be constructed in the manner disclosed in co-pending application Serial No. 218,873, filed April 2, 1951. Thus, each head can be constructed from an assembly of units having individual windings and pole pieces, and stacked with intervening electromagnetic and electrostatic shielding. The drawing schematically illustrates heads intended for multi-channel operation, and the magnetic pole pieces 116 which contact the magnetic tape, are spaced and positioned to correspond with the spacing and positioning of the capstan grooves 23. As disclosed in said co-pending application, the magnetic pole pieces 116 are arranged with a relatively narrow gap between them, and as viewed in plan (Figure 2), they are convex to provide an accurately formed area for contact with the magnetic tape.

Operation of the complete apparatus can be described as follows: That portion of the magnetic tape extending between the take-up and supply reels, is looped to engage the capstan and the guides 19 and 21, as illustrated in Figure 2. With the machine at rest the magnetic heads 16 and 17 will be in retracted position. The driving motor for the pump 101 is electrically coordinated whereby when the electrical motor which drives the capstan is started in operation, the pump 101 is likewise put in operation. With the solenoid 96 deenergized, the valve 106 is positioned whereby the pump supplies air under pressure to the line 49.

Figure 11:
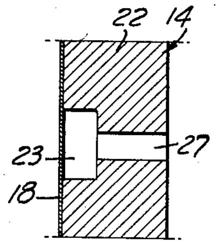
Figure 13:
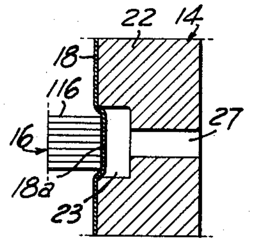
Figure 12:
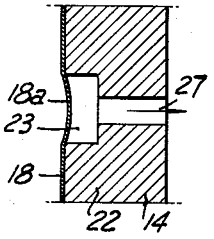

The effects produced by applying pneumatic suction and pressure to the capstan, can be best understood by referring to Figures 11 to 14, inclusive, in conjunction with Figures 4 and 5. Figure 11 illustrates light physical contact between the tape 18 and the periphery of the capstan. This is on the assumption that neither pressure nor suction is being applied to the groove 23. When suction is applied, the portion 18*a* of the tape which spans the groove 23 is bowed inwardly by the applied differential pressure, as illustrated in Figure 12. When pole pieces 116 are pressed upon the portion 18*a* of the tape, with continuance of pneumatic suction, a relationship is established as shown in Figure 13. Note that the portion 18*a* of the tape which extends across the face of the pole pieces 116, now conforms to the shaping of the pole pieces, as distinguished from the contour shown in Figure 12. It is therefore evident from Figures 12 and 13 that the pneumatic suction of itself applies an inward deflection to the portion 18*a* of the tape, and the contact and pressure applied by the pole pieces 116 causes a further deflection. Under such conditions the pole pieces are positioned for precision recording or reproduction.

Figure 14:
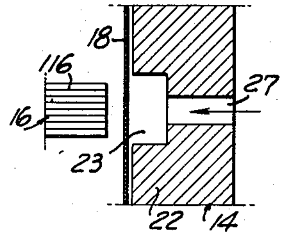

When the pole pieces 116 are retracted from the tape and pneumatic pressure applied to the groove 23, the tape is positioned as illustrated in Figure 14. The tape is forced outwardly in spaced relationship with the periphery of the capstan thus permitting continual discharge of air through the small clearance thus established between the tape and the capstan. Irrespective of any slight longitudinal tension which may be applied to the tape, the tape assumes a definite spaced positioning with respect to the periphery of the capstan, and this positioning precludes any face-to-face contact. Thus, under such conditions, relative movement may take place between the capstan and the tape, without any sliding contact, and without any wear upon the tape or the capstan. Although the tape is spaced with respect to the periphery of the capstan, there is a clinging effect due to the action of external atmospheric pressure, and this clinging action prevents displacement of the tape from the desired embracing relation with the capstan.

In Figures 11 to 14, inclusive, a single groove 23 is illustrated, and it is assumed that the pole pieces 116 are arranged in aligned position with this single groove for the recordation or reproduction of a single sound channel. However, as previously pointed out, for multi-channel operation, a plurality of such grooves is provided in the manner illustrated in Figure 5. The effect of applying pneumatic suction or pressure however, remains the same irrespective of the number of grooves 23 or channels employed.

It will be evident from Figure 2 that the tape 18 embraces over an arc slightly more than the angle over which the manifold member 36 applies suction or pressure to the distributor 26 and the grooves 23. However, the pressure acts upon all of the embracing portion of the tape in the manner previously described, to maintain a running clearance. Likewise, suction establishes the desired driving relation between the tape and the capstan, and this relation exists as the tape is brought into cooperative contact with the pole pieces.

The effects produced by applying pneumatic pressure to the capstan can be used to facilitate certain operations of the machine. Particularly it facilitates faster than normal movement of the tape relative to the capstan, such as is frequently desirable to accelerate shifting of the tape from one position to another. It can also be used to enable the tape to remain stationary while the capstan rotates at normal speed. Also, if desired, it can be used to permit wind back operations of the tape, although it is generally desirable during such operations to entirely remove the tape from the capstan.

I claim:

1. In magnetic tape apparatus of the character described, a capstan assembly including a member having a cylindrical exterior tape engaging surface, said surface being interrupted by a circumferential cavity adapted to be spanned by the tape when the tape is looped about the assembly, and means for establishing communication between the cavity and either sources of pneumatic pressure or suction, whereby the tape is either caused to press against and grip the exterior surface of the capstan assembly, or is separated therefrom by a small clearance, a movable magnetic head having pole pieces adapted to engage a portion of the tape which spans the cavity, and means for moving the head into operative pressing engagement with the tape when suction is being applied to the cavity, and for retracting the head from the tape when pressure is applied, the pole pieces of the head having an effective width which is less than the width of the cavity whereby said pole pieces engage only that portion of the tape which spans the cavity and which is being urged into the cavity by external atmospheric pressure.

2. In magnetic tape apparatus of the character described, a capstan assembly including a member having a cylindrical exterior tape engaging surface, said surface being interrupted by a circumferential cavity adapted to be spanned by the tape when the tape is looped about the assembly, means for establishing communication between the cavity and either sources of pneumatic suction or pressure, whereby the tape is either caused to press against and grip the exterior surface of the capstan assembly, or is separated therefrom by a small clearance, guide means for the portions of the tape extending toward and away from said member and serving to retain the tape loop against displacement axially of said member, a movable magnetic head having pole pieces adapted to engage that portion of the tape which spans the cavity, and means for moving the head into operative contact with the tape when suction is applied to the cavity and for retracting the head from the tape when pressure is applied, the pole pieces having an effective width less than the width of the cavity.

3. In magnetic tape apparatus of the character described, a capstan assembly including a rotatable member having a cylindrical outer surface for engaging one side face of a cooperating tape, said surface being interrupted by a circumferential cavity adapted to be spanned by a tape looped about said exterior surface, guide means for the portions of the tape extending toward and away from said member and serving to retain the tape loop against displacement axially of said member, pumping means forming sources of pneumatic pressure and suction, means including a control valve for establishing pneumatic connections between said pumping means and said cavity, said control valve in one of its operating positions serving to connect the source of suction to said cavity, and in its second operating position serving to connect source of pressure to said cavity, whereby the tape is either caused to press against and grip the exterior surface of the capstan assembly or is separated from said surface by a running clearance for free relative rotation of movement between the tape loop and the capstan assembly, said loop being retained against axial displacement by said guide means, a movable magnetic head having pole pieces adapted to engage that portion of the tape which spans the cavity and having a width less than the width of the cavity, and means for moving the head into operative contact with the tape when suction is applied to the cavity and for retracting the head from the tape when pressure is applied.

4. In magnetic tape apparatus of the character described, a capstan assembly including a member having a cylindrical exterior surface adapted to engage a magnetic tape, said surface being interrupted by a circumferential cavity adapted to be spanned by the tape, selective means for establishing communication between the cavity and either a source of pneumatic suction or pressure, whereby the tape is either caused to press against and grip the capstan assembly or is separated from said exterior surface by a running clearance, a magnetic head having pole pieces adapted to engage the tape, means for movably mounting said head alongside the capstan assembly whereby the pole pieces of the head may be moved either into or out of cooperative contact with that portion of the tape which spans the cavity, the width of the pole pieces being less than the width of the cavity, and means for moving the head into contact with the tape when suction is applied to said cavity and for causing the head to be retracted from contact with the tape when pneumatic pressure is applied to said cavity.

5. In apparatus as in claim 4, in which two magnetic heads are provided, one for recording and the other for reproducing, together with common means for moving both said heads.

6. Apparatus as in claim 4, together with guide means engaging the portions of the tape extending toward and away from said member, said guide means serving to retain the loop of the tape against displacement in a direction axially of said member when pneumatic pressure is applied to said cavity.

References Cited in the file of this patent

UNITED STATES PATENTS

| | | |
|---|---|---|
| 1,629,154 | Ybarrondo | May 17, 1927 |
| 2,080,279 | Kellogg | May 11, 1937 |
| 2,096,113 | Kiel | Oct. 19, 1937 |
| 2,100,751 | Runge | Nov. 30, 1937 |
| 2,242,548 | Regan | May 20, 1941 |
| 2,518,556 | Kolb | Aug. 15, 1950 |
| 2,530,029 | Pond | Nov. 14, 1950 |
| 2,535,486 | Dank | Dec. 26, 1950 |
| 2,542,590 | Stone | Feb. 20, 1951 |
| 2,620,404 | Pond | Dec. 2, 1952 |
| 2,654,809 | Camras | Oct. 6, 1953 |
| 2,698,183 | Lang | Dec. 28, 1954 |

FOREIGN PATENTS

| | | |
|---|---|---|
| 570,795 | Great Britain | July 23, 1945 |
| 598,148 | Great Britain | Feb. 11, 1948 |